US007100065B2

(12) United States Patent
Adkisson

(10) Patent No.: US 7,100,065 B2
(45) Date of Patent: *Aug. 29, 2006

(54) CONTROLLER ARRANGEMENT FOR SYNCHRONIZER DATA TRANSFER BETWEEN A CORE CLOCK DOMAIN AND BUS CLOCK DOMAIN EACH HAVING ITS OWN INDIVIDUAL SYNCHRONIZING CONTROLLER

(75) Inventor: Richard W. Adkisson, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 470 days.

This patent is subject to a terminal disclaimer.

(21) Appl. No.: 10/630,182

(22) Filed: Jul. 30, 2003

(65) Prior Publication Data

US 2004/0225910 A1    Nov. 11, 2004

Related U.S. Application Data

(60) Provisional application No. 60/469,120, filed on May 9, 2003.

(51) Int. Cl.
G06F 1/12 (2006.01)

(52) U.S. Cl. ............................ 713/400; 710/52; 700/90; 375/354; 375/356

(58) Field of Classification Search ................ 713/400; 710/52; 700/90; 375/354, 356; 365/221; 327/144

See application file for complete search history.

(56) References Cited

U.S. PATENT DOCUMENTS

| 4,519,037 | A | * | 5/1985 | Brodeur et al. ............... 700/90 |
| 5,256,912 | A | * | 10/1993 | Rios ........................... 327/144 |
| 5,347,559 | A | | 9/1994 | Hawkins et al. |
| 5,570,397 | A | * | 10/1996 | Kubista ....................... 375/356 |
| 5,721,886 | A | | 2/1998 | Miller |
| 5,884,100 | A | * | 3/1999 | Normoyle et al. ............ 710/52 |
| 6,075,832 | A | | 6/2000 | Geannopoulos et al. |
| 6,084,934 | A | | 7/2000 | Garcia et al. |
| 6,114,915 | A | | 9/2000 | Huang et al. |
| 6,134,155 | A | | 10/2000 | Wen |
| 6,175,603 | B1 | | 1/2001 | Chapman et al. |
| 6,246,275 | B1 | | 6/2001 | Wodnicki et al. |
| 6,249,875 | B1 | * | 6/2001 | Warren ........................ 713/400 |
| 6,326,824 | B1 | | 12/2001 | Hosoe et al. |
| 6,327,207 | B1 | * | 12/2001 | Sluiter et al. ................ 365/221 |
| 6,369,624 | B1 | | 4/2002 | Wang et al. |
| 6,529,083 | B1 | | 3/2003 | Fujita |
| 2002/0051509 | A1 | | 5/2002 | Lindner et al. |
| 2002/0158671 | A1 | | 10/2002 | Wang et al. |
| 2002/0199124 | A1 | * | 12/2002 | Adkisson ..................... 713/400 |

(Continued)

Primary Examiner—Chun Cao
Assistant Examiner—Sean Weinman

(57) ABSTRACT

A controller arrangement for effectuating data transfer across a clock boundary between a core clock domain and a bus clock domain, wherein the core clock domain is operable with a core clock signal and the bus clock domain is operable with a bus clock signal. A bus clock synchronizer controller portion is operable to generate a set of clock relationship control signals, at least a portion of which signals are used in generating a set of bus domain synchronizer control signals towards bus-to-core and core-to-bus synchronizers. A core clock synchronizer controller portion is provided for generating a set of core domain synchronizer control signals towards the synchronizers. The core clock synchronizer controller portion is operable responsive to the clock relationship control signals as well as configuration information signals indicative of different skew tolerances and latency values associated with the clock signals.

30 Claims, 11 Drawing Sheets

U.S. PATENT DOCUMENTS

2004/0223564 A1* 11/2004 Adkisson .................... 375/354
2004/0225909 A1* 11/2004 Adkisson .................... 713/400

* cited by examiner

CONTROLLER ARRANGEMENT FOR SYNCHRONIZER DATA TRANSFER BETWEEN A CORE CLOCK DOMAIN AND BUS CLOCK DOMAIN EACH HAVING ITS OWN INDIVIDUAL SYNCHRONIZING CONTROLLER

PRIORITY UNDER 35 U.S.C. §119(e) & 37 C.F.R. §1.78

This nonprovisional application claims priority based upon the following prior United States provisional patent application entitled: "Programmable Clock Synchronizer and Controller Arrangement Therefor," Application. No.: 60/469,120, filed May 9, 2003, in the name(s) of: Richard W. Adkisson, which is hereby incorporated by reference.

CROSS-REFERENCE TO RELATED APPLICATION(S)

This application discloses subject matter related to the subject matter disclosed in the following commonly owned co-pending patent applications: following commonly owned co-pending patent applications: (i) "Programmable Clock Synchronizer," filed on Jul. 30, 2003; application Ser. No. 10/630,159, in the name(s) of: Richard W. Adkisson; (ii) "System and Method for Synchronizing Multiple Synchronizer Controllers," filed on Jul. 30, 2003; application Ser. No. 10/629,989, in the name(s) of: Richard W. Adkisson; (iii) "System and Method for Maintaining a Stable Synchronization State in a Programmable Clock Synchronizer," tiled on Jul. 30, 2003; application Ser. No. 10/630,297, in the name(s) of: Richard W. Adkisson; (iv) "System and Method for Compensating for Skew between a First Clock Signal and a Second Clock Signal," filed on Jul. 30, 2003; application Ser. No. 10/630,217, in the name(s) of: Richard W. Adkisson; and (v) "Phase Detector for a programmable Clock Synchronizer," filed on Jul. 30, 2003; application Ser. No. 10/630,298 (now issued as U.S. Pat. No. 6,864,722), in the name(s) of: Richard W. Adkisson, all of which are incorporated by reference herein.

BACKGROUND

Digital electronic systems, e.g., computer systems, often need to communicate using different interfaces, each running at an optimized speed for increased performance. Typically, multiple clock signals having different frequencies are utilized for providing appropriate timing to the interfaces. Further, the frequencies of such clock signals are generally related to one another in a predetermined manner. For example, a core or system clock running at a particular frequency ($F_C$) may be utilized as a master clock in a typical computer system for providing a time base with respect to a specific portion of its digital circuitry. Other portions of the computer system's digital circuitry (such as a bus segment and the logic circuitry disposed thereon) may be clocked using timing signals derived from the master clock wherein the derived frequencies ($F_D$) follow the relationship: $F_C/F_D \geq 1$.

Because of the asynchronous—although related—nature of the constituent digital circuit portions, synchronizer circuitry is often used in computer systems to synchronize data transfer operations across a clock domain boundary so as to avoid timing-related data errors. Such synchronizer circuitry is typically required to possess low latency (which necessitates precise control of the asynchronous clocks that respectively clock the circuit portions in two different clock domains). Furthermore, since phase-locked loops (PLLs) utilized in conventional arrangements to produce clocks of different yet related frequencies can have a large amount of input/output (I/O) jitter, it is essential that the synchronizer circuitry be able to tolerate significant amounts of low frequency phase difference (or, skew) between the clocks generated thereby.

SUMMARY

A synchronizer controller arrangement is provided for effectuating data transfer across a clock boundary between a core clock domain and a bus clock domain, wherein the core clock domain is operable with a core clock signal and the bus clock domain is operable with a bus clock signal. A bus clock synchronizer controller portion is operable to generate a set of clock relationship control signals, at least a portion of which signals are used in generating a set of bus domain synchronizer control signals towards bus-to-core and core-to-bus synchronizers. A core clock synchronizer controller portion is provided for generating a set of core domain synchronizer control signals towards the synchronizers. The core clock synchronizer controller portion is operable responsive to the clock relationship control signals as well as configuration information signals indicative of different skew tolerances and latency values associated with the clock signals.

DETAILED DESCRIPTION OF THE DRAWINGS

Figure 1:
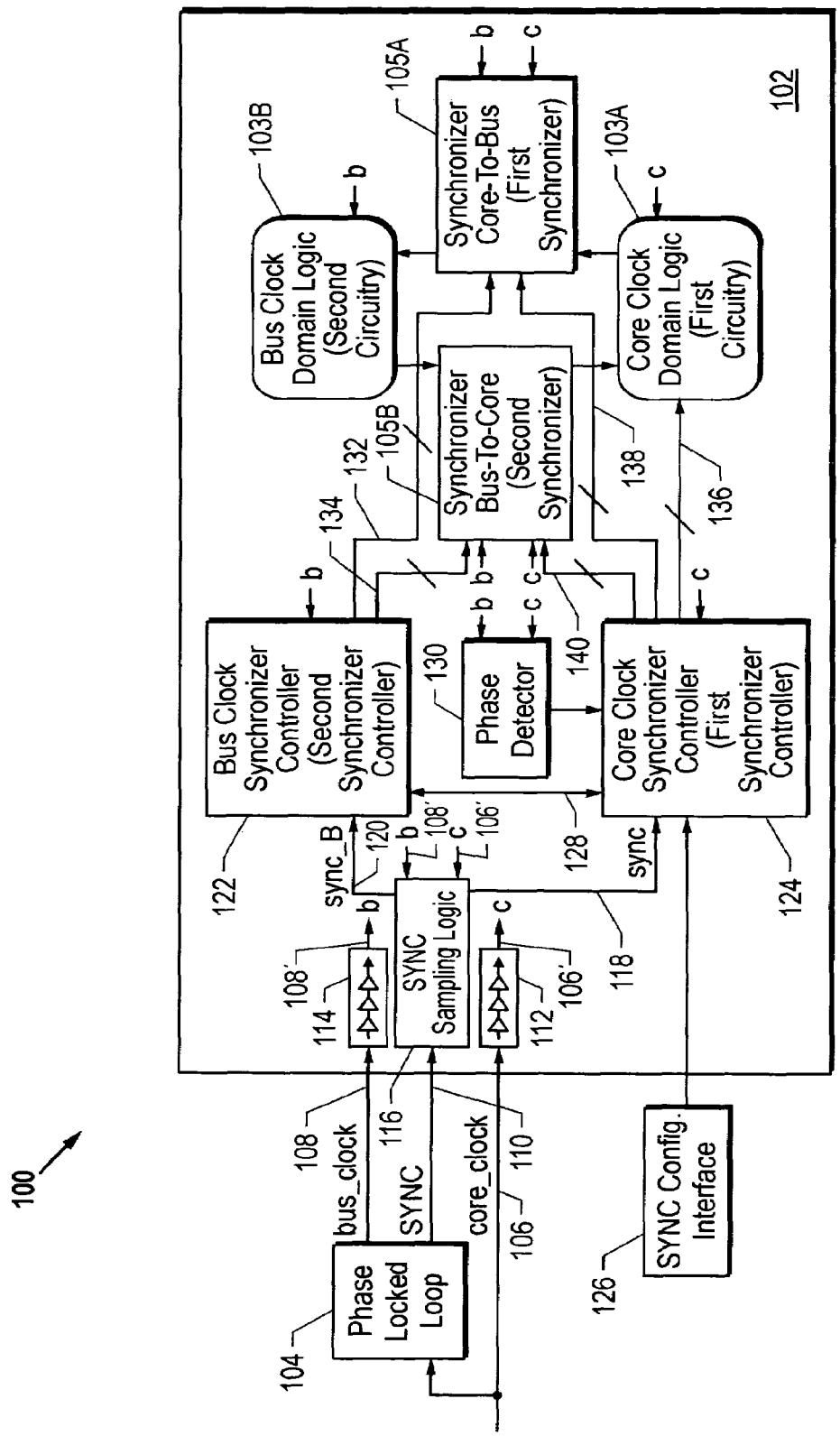
FIG. 1 depicts a block diagram of an embodiment of a programmable synchronizer system for effectuating data transfer across a clock boundary.

In the drawings, like or similar elements are designated with identical reference numerals throughout the several views thereof, and the various elements depicted are not necessarily drawn to scale. Referring now to FIG. 1, therein is depicted an embodiment of a programmable synchronizer system 100 for effectuating data transfer across a clock boundary between a first clock domain (i.e., "fast clock domain") having N clock cycles and a second clock domain (e.g., "slow clock domain") having M clock cycles such that N/M>1. Typically, M=(N−1), and by way of exemplary implementation, the synchronizer system 100 may be provided as part of a computer system for transferring data between a faster core clock domain (e.g., operating with a core clock signal of 250 MHz) and a slower bus clock domain (e.g., operating with a bus clock signal of 200 MHz), with a 5:4 frequency ratio. Accordingly, for purposes of this present patent application, the terms "first clock" and "core clock" will be used synonymously with respect to a fast clock domain; likewise, the terms "second clock" and "bus clock" will be used with respect to a slow clock domain.

A phase-locked loop (PLL) circuit 104 is operable to generate a SYNC pulse 110 and a bus clock (i.e., second clock) signal 108 (designated as bus_clock) based on a core clock (i.e., first clock) signal 106 (designated as core_clock) provided thereto. As will be seen below, the SYNC pulse 110 provides a reference point for coordinating data transfer operations and is driven HIGH when the bus_clock and core_clock signals have coincident rising edges. The two clock signals 106, 108 and SYNC pulse 110 are provided to a synchronizer/controller block 102 that straddles the clock boundary between a first clock domain (i.e., core clock domain) and a second clock domain (i.e., bus clock domain) for effectuating data transfer across the boundary. Reference numerals 103A and 103B refer to circuitry disposed in the first and second clock domains, respectively, e.g., core clock domain logic and bus clock domain logic, that transmit and receive data therebetween as facilitated via synchronizers 105A and 105B, which will be described in greater detail hereinbelow.

Each of the core_clock and bus_clock signals 106, 108 is first provided to a respective clock distribution tree block for generating a distributed clock signal that is provided to various parts of the synchronizer/controller block 102. Reference numeral 112 refers to the clock distribution tree operable with the core_clock signal 106 to generate the distributed core clock signal, which is labeled as "c" and shown with reference numeral 106' in FIG. 1. Likewise, reference numeral 114 refers to the clock distribution tree 114 operable with the bus_clock signal 108 to generate the distributed bus_clock signal, which is labeled as "b" and shown with reference numeral 108' in FIG. 1. As one skilled in the art should readily recognize, the distributed clock signals are essentially the same as the input clock signals. Accordingly, the core_clock signal 106 and its distributed counterpart c 106' are treated equivalently hereinafter. Also, the bus_clock signal 108 and its distributed counterpart b 108' are similarly treated as equivalent.

A SYNC sampling logic block 116 is operable responsive to the distributed clock signals 106', 108' and SYNC pulse signal 110, to generate a pair of sampled SYNC pulses that are forwarded to appropriate synchronizer controller circuitry. As shown in additional detail in reference to FIG. 8A, the sampled SYNC pulses are manufactured as follows in one embodiment. The SYNC pulse 110 is sampled twice by two flip flop (FF) elements that are clocked on the rising edge of the distributed core_clock, c 106'. As may be appreciated, sampling by two FF elements is effective in eliminating metastability associated with the SYNC pulse 110 (possibly arising due to the skew between the input signal, core_clock 106 and the output signal, SYNC 110). The twice-sampled SYNC pulse is designated as "sync" signal 118 in FIG. 1, which is provided to a first synchronizer controller (or, core clock synchronizer controller) 124 operating in the first clock domain.

With respect to the second clock domain (i.e., bus clock domain), the SYNC pulse 110 is sampled in the SYNC sampling logic block 116 by a single FF element (shown in FIG. 8A) that is clocked on the rising edge of the distributed bus_clock, b 108'. To signify that the sampling is done using the bus_clock, the sampled SYNC pulse is designated as "sync_B" signal 120, which is provided to a second synchronizer controller 122 operating in the second clock domain, also referred to as the bus clock synchronizer controller in FIG. 1.

The bus clock synchronizer controller 122 is operable responsive to the distributed bus_clock, b 108' and sampled sync_B pulse 120 to generate a plurality of synchronizer control signals, a portion of which signals are directed to a first synchronizer circuit means 105A operating to control data transfer from first circuitry 103A (i.e., core clock domain logic) to second circuitry 103B (i.e., bus clock domain logic). Reference numeral 132 refers to the signal path of this portion of control signals emanating from the bus clock synchronizer controller 122. Another portion of the synchronizer control signals generated by the bus clock synchronizer controller 122 are directed (via signal path 134) to a second synchronizer circuit means 105B operating to control data transfer from second circuitry 103B to first circuitry 103A. Consistent with the nomenclature used in the present patent application, the first and second synchronizer circuits may also be referred to as core-to-bus synchronizer and bus-to-core synchronizer circuits, respectively. In addition, the bus clock synchronizer controller 122 also generates a set of inter-controller control signals that are provided to the first synchronizer controller 124 (i.e., core clock synchronizer controller) such that both controllers can work together. Reference numeral 128 refers to the signal path of the inter-controller clock relationship control signal(s) provided to the core clock synchronizer controller 124. As will be seen in additional detail below, part of the functionality of the inter-controller control signals is provide clock relationship information to the core clock synchronizer controller 124 so that it can generate its synchronizer control signals at an appropriate time with respect to the bus and core clock signals.

Similar to the operation of the bus clock synchronizer controller 122, the core clock synchronizer controller 124 is operable responsive to the distributed core_clock, c 106', inter-controller control signals and sampled sync pulse 118 to generate a plurality of synchronizer control signals, a portion of which signals are directed to the first synchronizer circuit means 105A and another portion of which signals are directed to the second synchronizer circuit means 105B. Reference numerals 138 and 140 refer to the respective signal paths relating to these control signals. The core clock synchronizer controller 124 also generates data transmit/receive control signals that are provided to the core clock domain logic 103A via signal path 136 in order that the core clock domain logic 103A knows when it can send data to the bus clock domain logic 103B (i.e., valid TX operations) and when it can receive data from the bus clock domain logic 103B (i.e., valid RX operations).

All control signals from the bus clock synchronizer controller 122 to the first and second synchronizers 105A, 105B are staged through one or more FF elements that are clocked with the distributed bus_clock, b 108'. Likewise, the control signals from the core clock synchronizer controller 124 are staged through a number of FF elements clocked with the sample core_clock, c 106', before being provided to the various parts of the synchronizer system 100. Accordingly, as will be seen in greater detail below, the various control signals associated with the synchronizer system 100 may be designated with a signal label that is concatenated with a "_ff" or "_ff_B" suffix to indicate the registration process by the distributed core_clock or the distributed bus_clock.

A phase detector 130 detects phase differences (i.e., skew) between the two clock signals by operating responsive to the sampled bus_clock and core_clock signals. This information is provided to the core clock synchronizer controller 124, which can compensate for the skew or determine appropriate times to coordinate with the bus clock synchronizer controller 122.

Where the bus clock signal is stable with respect to the SYNC pulse, the inter-controller clock relationship control signals are generated by the bus clock synchronizer controller 122 that provide information as to the frequency ratio of the first and second clock signals, clock sequence information and SYNC delay, which are transmitted to the core clock synchronizer controller 124 for synchronizing its core clock signal in accordance therewith, as will be seen in greater detail below. On the other hand, where the core clock signal is stable with respect to the SYNC pulse, the inter-controller clock relationship control signals may be generated by the core clock synchronizer controller 124 for transmission to the bus clock synchronizer controller 122 so that both synchronizer controllers may be appropriately synchronized. Further, a configuration interface 126, labeled as SYNC_Config in FIG. 1, is provided as part of the programmable synchronizer system 100 for configuring the core clock synchronizer controller 124 so that it may be programmed for different skew tolerances, latencies and modes of operation. In one embodiment, the configuration interface 126 may be implemented as a register having a plurality of bits. In another embodiment, a memory-based setting, e.g., EPROM-stored settings, may be provided as a SYNC configuration interface.

As set forth above, the synchronizer system 100 may be programmed for different skew tolerances and latencies, so that data transfer at high speeds can proceed properly even where there is a high skew or requirement of low latency. Further, the synchronizer system 100 can operate with any two clock domains having a ratio of N first clock cycles to M second clock cycles, where $N/M \geq 1$. For purposes of illustration, the operation of an embodiment of the programmable synchronizer system 100 and its controller arrangement (i.e., the bus clock synchronizer controller portion 122 and core clock synchronizer controller portion 124) is set forth in detail below for clock domains with a 5:4 frequency ratio.

Figure 2:
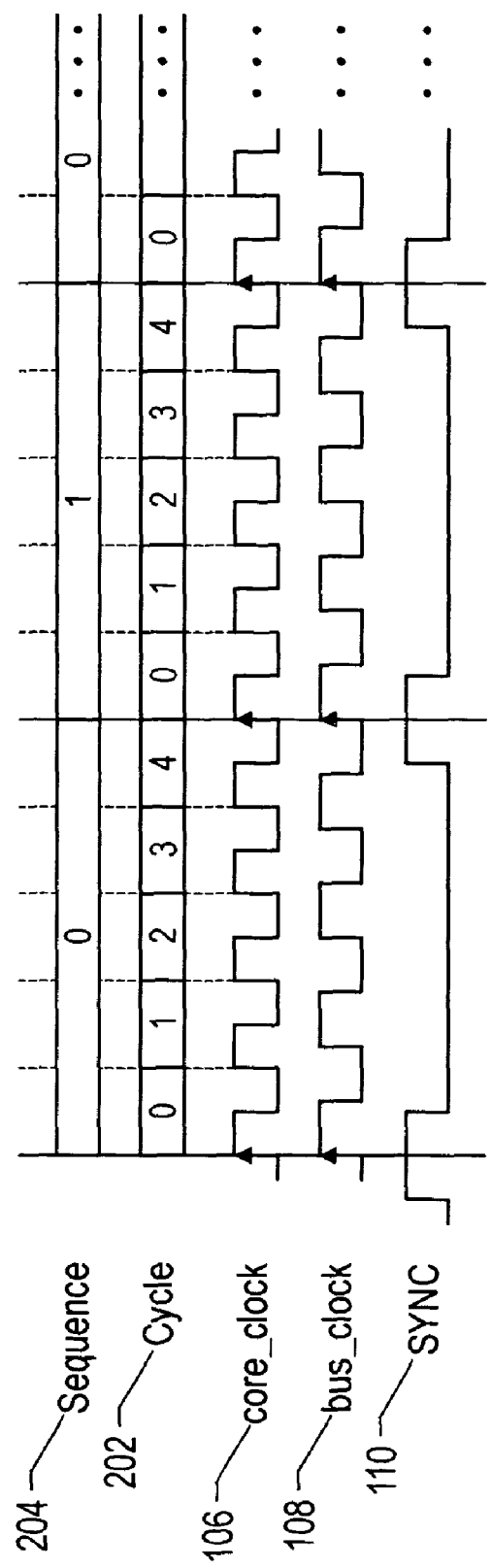
FIG. 2 depicts a timing diagram of two clock domains having a 5:4 frequency ratio wherein the programmable synchronizer system of FIG. 1 may be utilized for effectuating data transfer across the clock boundary.

Referring now to FIG. 2, depicted therein is a timing diagram 200 associated with two clock domains having a 5:4 frequency ratio. By way of example, the core_clock signal 106 is provided as the fast clock and the bus_clock signal 108 is provided as the slow clock. Accordingly, for every five ticks of the core_clock, there are four ticks of the bus_clock. As alluded to before, the SYNC pulse 110 is generated when a rising edge of the core_clock signal 106 coincides with a rising edge of the bus_clock signal 108, which commences a timing sequence window 204 for the transfer of data, that may comprise k-bit wide data ($k \geq 1$), from one clock domain to the other clock domain. A cycle count 202 refers to the numbering of core_clock cycles in a particular timing sequence 204.

As pointed above, the SYNC pulse 110 is driven HIGH on coincident rising edges of the clock signals and the data transfer operations across the clock boundary between the two clock domains are timed with reference to the SYNC pulse. In a normal condition where there is no skew (or, jitter, as it is sometimes referred to) between the clock signals, the coincident edges occur on the rising edges of the first cycle (cycle 0) as shown in FIG. 2. Since there are five core_clock cycles and only four bus_clock cycles, the first clock domain circuitry cannot transmit data during one cycle, resulting in what is known as a "dead tick," as the second clock domain circuitry does not have a corresponding time slot for receiving it. Typically, the cycle that is least skew tolerant is the one where data is not transmitted. Likewise, because of an extra cycle (where the data is indeterminate and/or invalid), the first clock domain circuitry cannot receive data during one cycle. Again, it is the cycle with the least skew tolerance during which the data is not received by the first clock domain circuitry.

Skew between the clock signals can cause, for example, a variance in the positioning of the SYNC pulse which affects the data transfer operations between the two domains. In the exemplary 5:4 frequency ratio scenario set forth above, if the bus_clock 108 leads the core_clock 106 by a quarter cycle for instance, then instead of the edges being coincident at the start of cycle 0, they will be coincident at the start of cycle 1. In similar fashion, if the bus_clock signal lags the core_clock signal by a quarter cycle, the edges will be coincident at the start of the last cycle (i.e., cycle 4). Regardless of the skew between the clock cycles, however, there will be one cycle where data cannot be sent and one cycle where data cannot be received, from the perspective of the core clock domain circuitry.

Figure 3:
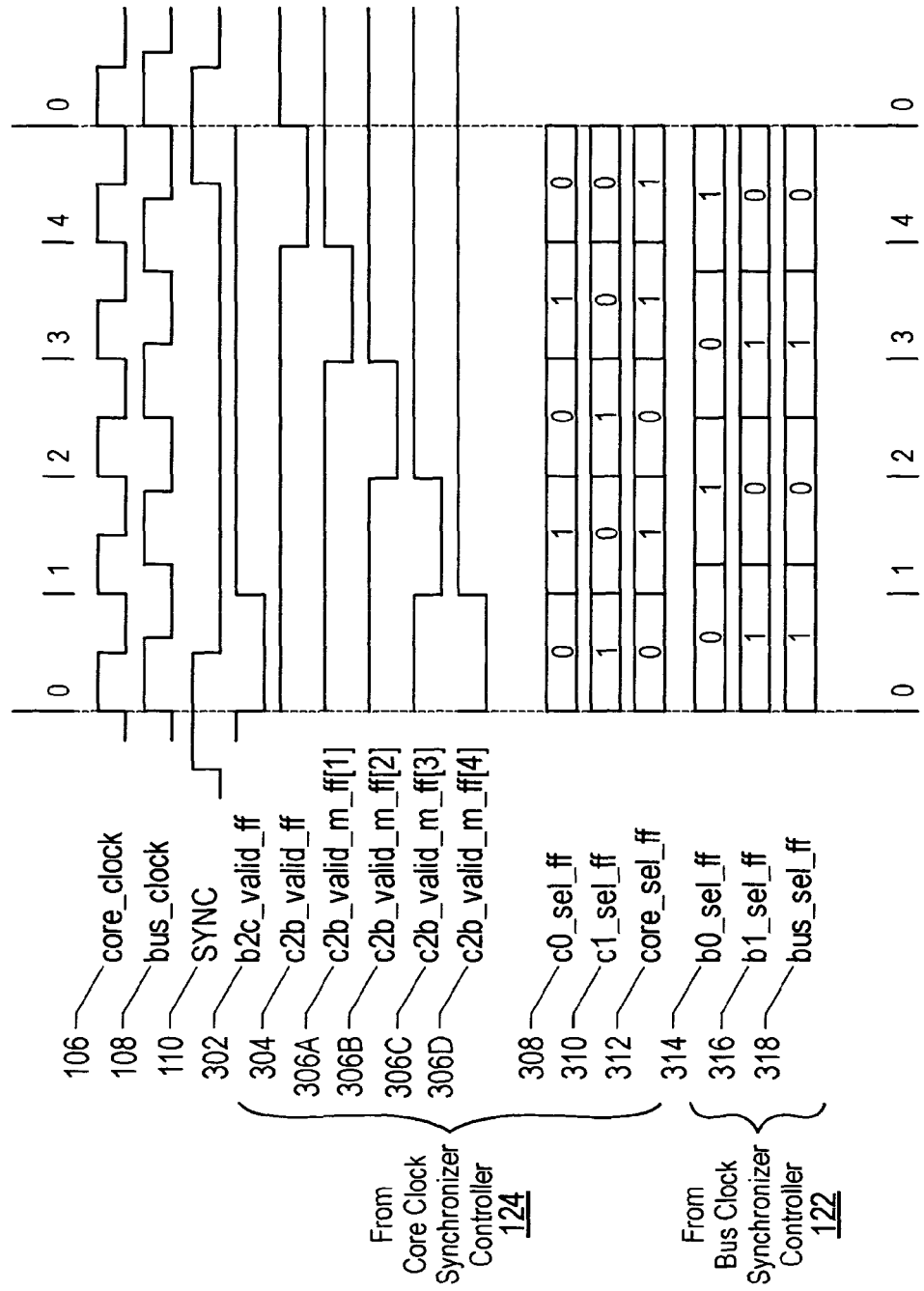
FIG. 3 depicts a timing diagram of the various control signals associated with the programmable synchronizer system for transferring data between two clock domains having a 5:4 frequency ratio.

FIG. 3 depicts a timing diagram 300 of the various control signals associated with an embodiment of the programmable synchronizer system 100 for transferring data between two clock domains having 5:4 frequency ratio. The clock cycles 106, 108 and SYNC pulse 110 are depicted again for showing the temporal relationship among the control signals. Reference numeral 302 refers to a b2c_valid_ff signal (active HIGH) that is generated by the core clock synchronizer controller 124 for specifying one of the five cycles during which the core clock domain circuitry 103A cannot receive data supplied by the bus clock domain circuitry 103B. As illustrated, data may be received from the bus clock domain circuitry 103B in cycles 1–4, but not in cycle 0. Likewise, since there is a dead tick between the core and bus clocks, the core clock synchronizer controller 124 also provides a c2b_valid_ff signal 304 to indicate when the core clock domain circuitry 103A can validly transmit data to the bus clock domain circuitry 103B. Further, a series of "advance warning" signals (each being active HIGH), c2b_valid_m_ff[4:1] 306A–306D, are provided for indicating a number of cycles ahead of time as to when the dead cycle occurs between the first and second clock signals during which the core clock domain circuitry 103A cannot transmit data. For instance, c2b_valid_ff 304 is asserted LOW in cycle 4, indicating that the core clock domain circuitry 103A cannot send data in that particular cycle. Core clock domain data during that cycle may have to be buffered accordingly before it is transmitted in a subsequent cycle. Advance warning as to the occurrence of the dead cycle may be given ahead by one cycle (i.e., in cycle 3, as indicated by c2b_valid_m_ff[1] 306A that is asserted LOW in cycle 3), by two cycles (i.e., in cycle 2, as indicated by c2b_valid_m_ff[2] 306B that is asserted LOW in cycle 2), by three cycles (i.e., in cycle 1, as indicated by c2b_valid_m_ff[3] 306C that is asserted LOW in cycle 1), and by four cycles (i.e., in cycle 0, as indicated by c2b_valid_m_ff[4] 306D that is asserted LOW in cycle 0).

Since the b2C_valid and c2b_valid control signals operate to indicate when a valid data transfer may occur, these signals may collectively be referred to as "transfer control" signals provided by the core clock synchronizer controller 124. Further, as will be seen below in additional detail, the core clock synchronizer controller 124 also generates another set of control signals, namely, the synchronizer control signals staged through flip flops (c0_sel_ff 308, c1_sel_ff 310 and core_sel_ff 312) that control the data loading and data capture circuitry of the synchronizers 105A, 105B. Likewise, the bus clock synchronizer controller 122 generates another set of synchronizer control signals (represented as b0_sel_ff 314, b1_sel_ff 316 and bus_sel_ff 318 after registration) that also control the data loading and data capture circuitry of the synchronizers 105A, 105B, which are described below.

Figure 4A:
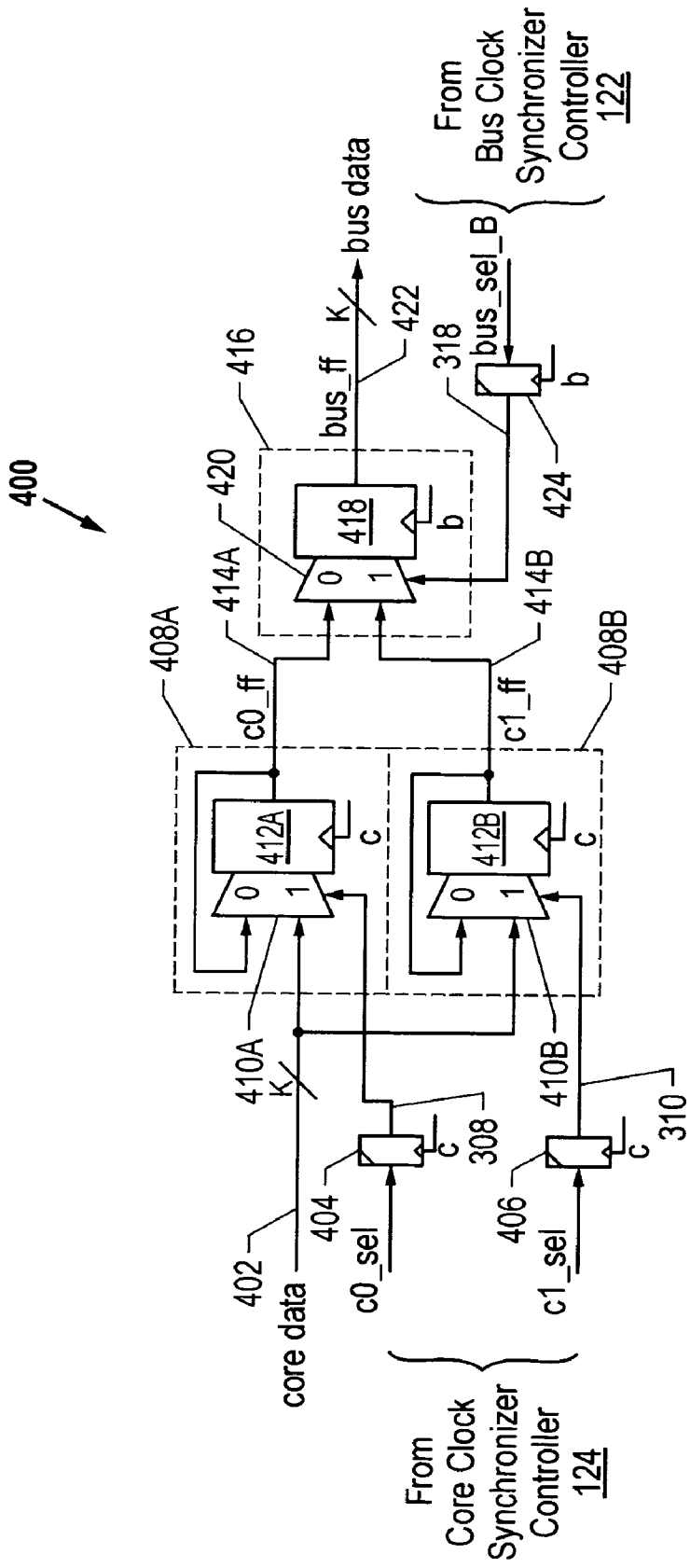
FIG. 4A depicts a block diagram of an embodiment of a synchronizer circuit for transferring data from a first clock domain (i.e., "fast clock domain" or "core clock domain") to a second clock domain (i.e., "slow clock domain" or "bus clock domain"), wherein the clock domains have a 5:4 frequency ratio.

FIG. 4A depicts a block diagram of an embodiment of a synchronizer circuit 400 for transferring data from a first clock domain to a second clock domain, wherein the clock domains have a 5:4 frequency ratio. It should be apparent that the synchronizer circuit 400 is a particular embodiment of the first synchronizer (i.e., core-to-bus synchronizer) 105A shown in FIG. 1 that is adapted to operate with the various control signals described hereinabove. Data 402 from the first clock domain (i.e., core data from the core clock domain logic) is provided on a k-bit wide data path to the input side of the synchronizer circuit 400 that essentially comprises a first TRANSMIT multiplexer-register (MUXREG) block 408A and a second TRANSMIT MUXREG block 408B. Each of the TRANSMIT MUXREG blocks includes a 2:1 MUX coupled to a register that is clocked by the first clock signal (i.e., the distributed core_clock, c 106'), wherein the k-bit wide data is provided to the input of the 2:1 MUX that is selected when a MUX control signal is driven HIGH. The other input of the 2:1 MUX is coupled via a feedback path to the output of the register associated therewith. In the embodiment shown in FIG. 4A, register 412A and associated 2:1 MUX 410A form the first TRANSMIT MUXREG block 408A, wherein the 2:1 MUX 410A is controlled by c0_sel_ff 308 (generated by the core clock synchronizer controller 124) that is staged thorough FF 404. Likewise, register 412B and associated 2:1 MUX 410B form the second TRANSMIT MUXREG block 408B, wherein the 2:1 MUX 410B is controlled by c1_sel_ff 310 (also generated by the core clock synchronizer controller 124) that is staged thorough FF 406. Each of the FF elements 404 and 406 is clocked by the distributed core_clock, c 106'.

Each of the outputs of the two TRANSMIT MUXREG blocks 408A, 408B, i.e., c0_ff 414A and c1_ff 414B, respectively, is provided to a RECEIVE MUXREG block 416 on the output side of the synchronizer circuit 400, which includes a 2:1 MUX 420 and a register 418 that is clocked by the second clock signal (i.e., the distributed bus_clock, b 108'). MUX control is provided by bus_sel_B that is generated by the bus clock synchronizer controller 122 and staged through FF 424 as bus_sel_ff 318. The output of the RECEIVE MUXREG block 416 (i.e., bus_ff) is the k-bit wide data received in the bus clock domain logic as bus data 422.

Figure 4B:
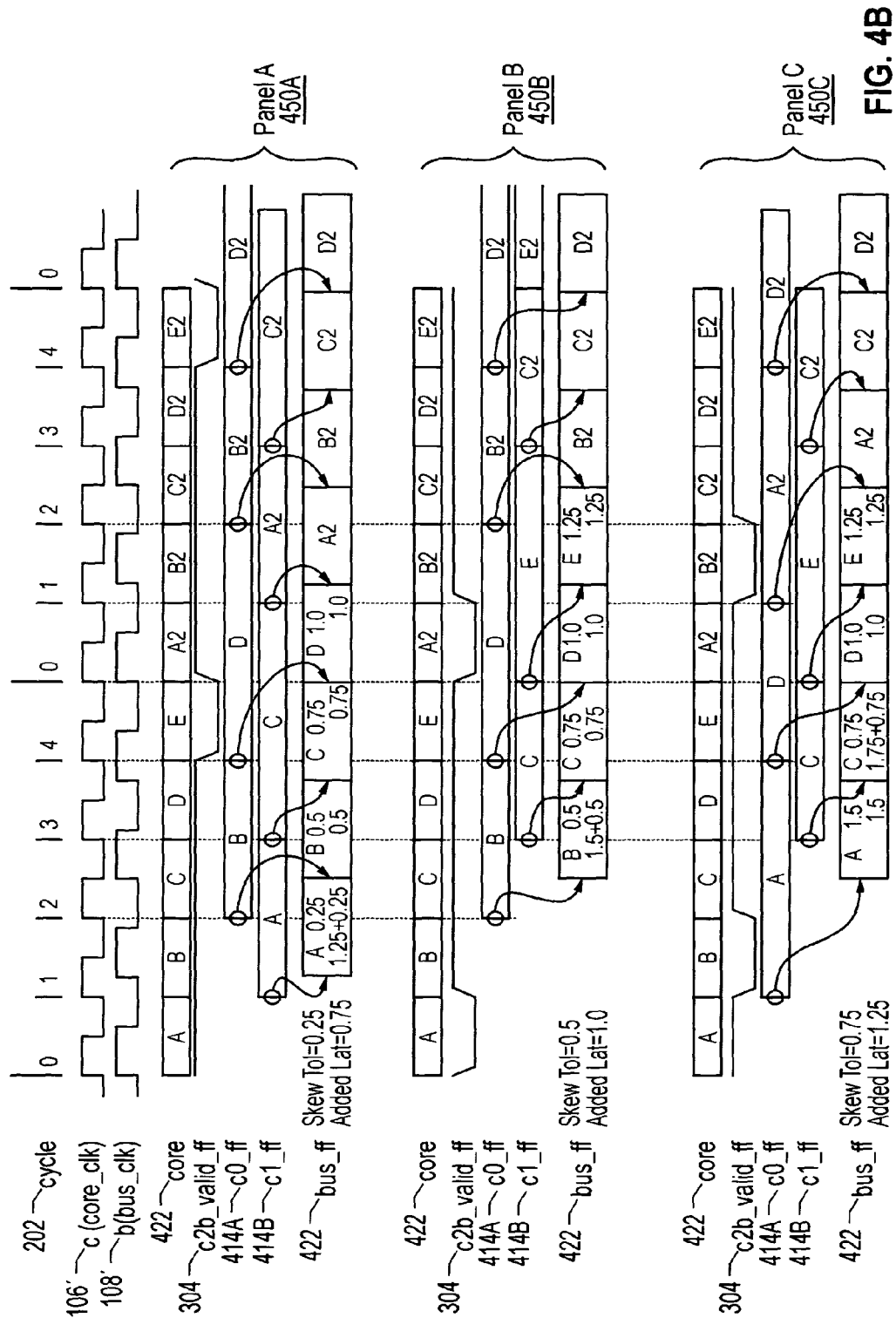
FIG. 4B depicts a timing diagram associated with the synchronizer circuit shown in FIG. 4A.

It should be apparent that although single instances of the various MUXREG blocks are shown in FIG. 4A, there are in fact k such blocks in the data path through the core-to-bus synchronizer 400 to synchronize the transfer of all k data signals (of the k-bit wide data, $k \geq 1$) from the core clock domain logic to the bus clock domain logic. FIG. 4B depicts a timing diagram associated with the core-to-bus synchronizer embodiment 400 which illustrates the temporal relationship of the various control signals associated therewith and the effect of different skew tolerances and latencies. Two sequences of core data 402, [A,B,C,D,E] and [A2,B2,C2,D2,E2], are exemplified, each data block being k-bit wide and available for a particular clock cycle, 0 through 4. Different skew tolerances and latency factors may be programmed by controlling what the RECEIVE MUXREG block 416 loads from c0_ff 414A or c1_ff 414B. In Panel A 450A, data transfer from the core domain circuitry to the bus domain circuitry is shown where a condition involving skew tolerance of 0.25 (of a core clock period) and added latency of 0.75 (of a core clock period) is programmed. Under these conditions, the core clock synchronizer controller 124 generates the c2b_valid_ff 304 signal such that there is no valid TX operation on cycle 4 (i.e., the fifth cycle). Accordingly, the TRANSMIT MUXREG blocks 408A and 408B respectively load the data portions [B,D] and [A,C] in each sequence, as controlled by c0_sel_ff 308 and c1_sel_ff 310. The data portion in cycle 4, [E], is not sent, which may be buffered and/or transmitted subsequently on a separate data path. The RECEIVE MUXREG block 416 alternatively loads from c0_ff 414A (for the [B,D] portion) and c1_ff 414B (for the [A,C] portion) under the control of bus_sel_ff 318 from the bus clock synchronizer controller 122. The data from the RECEIVE MUXREG block 416 is clocked out using the distributed bus_clock, b 108', as bus_ff 422 (i.e., bus data), the sequences being [A,B,C,D] and [A2,B2,C2,D2].

Likewise, in Panels 450B and 450C, data transfers involving skew tolerance of 0.5 and added latency of 1.0 and skew tolerance of 0.75 and added latency of 1.25 are respectively shown. Under these conditions, the core clock synchronizer controller 124 determines that data transmit operations in cycle 0 and cycle 1, respectively, are invalid. Accordingly, c2b_valid_ff 304 signals that are asserted LOW in cycle 0 and in cycle 1 are provided by the core clock synchronizer controller to indicate that data portion [A] and data portion [B] cannot be transmitted. As a result, the transmitted bus data sequences are [B,C,D,E]/[B2,C2,D2,E2] and [A,C,D,E]/[A2,C2,D2,E2], respectively, under the two sets of skew/latency combinations illustrated.

Figure 5A:
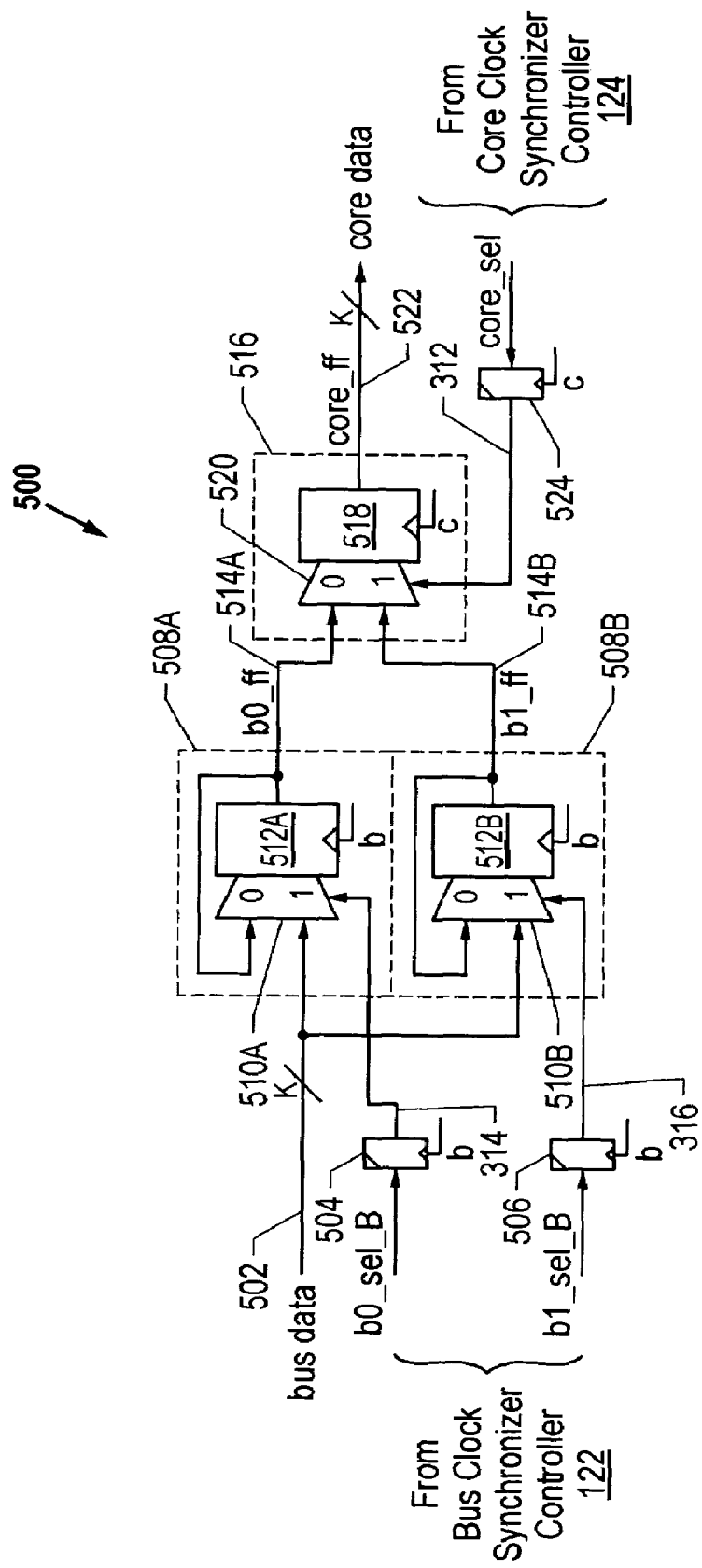
FIG. 5A depicts a block diagram of an embodiment of a synchronizer circuit for transferring data from the second clock domain (i.e., "slow clock domain" or "bus clock domain") to the first clock domain (i.e., "fast clock domain" or "core clock domain"), wherein the clock domains have a 5:4 frequency ratio.

Referring now to FIG. 5A, depicted therein is a block diagram of an embodiment of a synchronizer circuit 500 for transferring data from a bus clock domain to a core clock domain, wherein the core and bus clock domains have a 5:4 frequency ratio. Again, those skilled in the art will recognize that the synchronizer circuit 500 is a particular embodiment of the second synchronizer (i.e., bus-to-core synchronizer) 105B shown in FIG. 1 that is adapted to operate with the various control signals described hereinabove with particular reference to FIG. 3. Further, it should be apparent that the physical circuitry of the bus-to-core synchronizer 500 is essentially similar to that of the core-to-bus synchronizer 400 set forth in detail above, but for being wired with different control signals, appropriately generated by the synchronizer controllers.

Data 502 from the second clock domain (i.e., bus data from the bus clock domain logic) is provided on a k-bit wide data path to the input side of the synchronizer circuit 500 that comprises a pair of TRANSMIT MUXREG blocks 508A, 508B disposed in the bus clock domain. Each of the TRANSMIT MUXREG blocks includes a 2:1 MUX coupled to a register that is clocked by the second clock signal (i.e., the distributed bus_clock, b 108'), wherein the k-bit wide bus data 502 is provided to the input of the 2:1 MUX that is selected when a MUX control signal is driven HIGH. The other input of the 2:1 MUX is coupled via a feedback path to the output of the register associated therewith. In the embodiment shown in FIG. 5A, register 512A and associated 2:1 MUX 510A form the first TRANSMIT MUXREG block 508A disposed in the second clock domain, wherein the 2:1 MUX 510A is controlled by b0_sel_B (generated by the bus clock synchronizer controller 122 as will be described in greater detail below) that is staged thorough FF 504 as b0_sel_ff 314. Likewise, register 512B and associated 2:1 MUX 510B form the second TRANSMIT MUXREG block 508B disposed in the second clock domain, wherein the 2:1 MUX 510B is controlled by b1_sel_B (also generated by the bus clock synchronizer controller 122) that is staged thorough FF 506 as b1_sel_ff 316. Each FF 504, 506 is clocked by the distributed bus_clock, b 108'.

The outputs of the two TRANSMIT MUXREG blocks 508A, 508B, i.e., b0_ff 514A and b1_ff 514B, respectively, are provided to a RECEIVE MUXREG block 516 on the output side of the synchronizer circuit 500 (i.e., disposed in the first clock domain), which includes a 2:1 MUX 520 and a register 518 that is clocked by the first clock signal (i.e., the distributed core_clock, c 106).'MUX control is provided by core_sel_ff 312 that is generated by the core clock synchronizer controller 124 as core_sel and staged through FF 524. The output of the RECEIVE MUXREG block 516 (i.e., core_ff) is the k-bit wide data received in the core clock domain logic as core data 522.

Figure 5B:
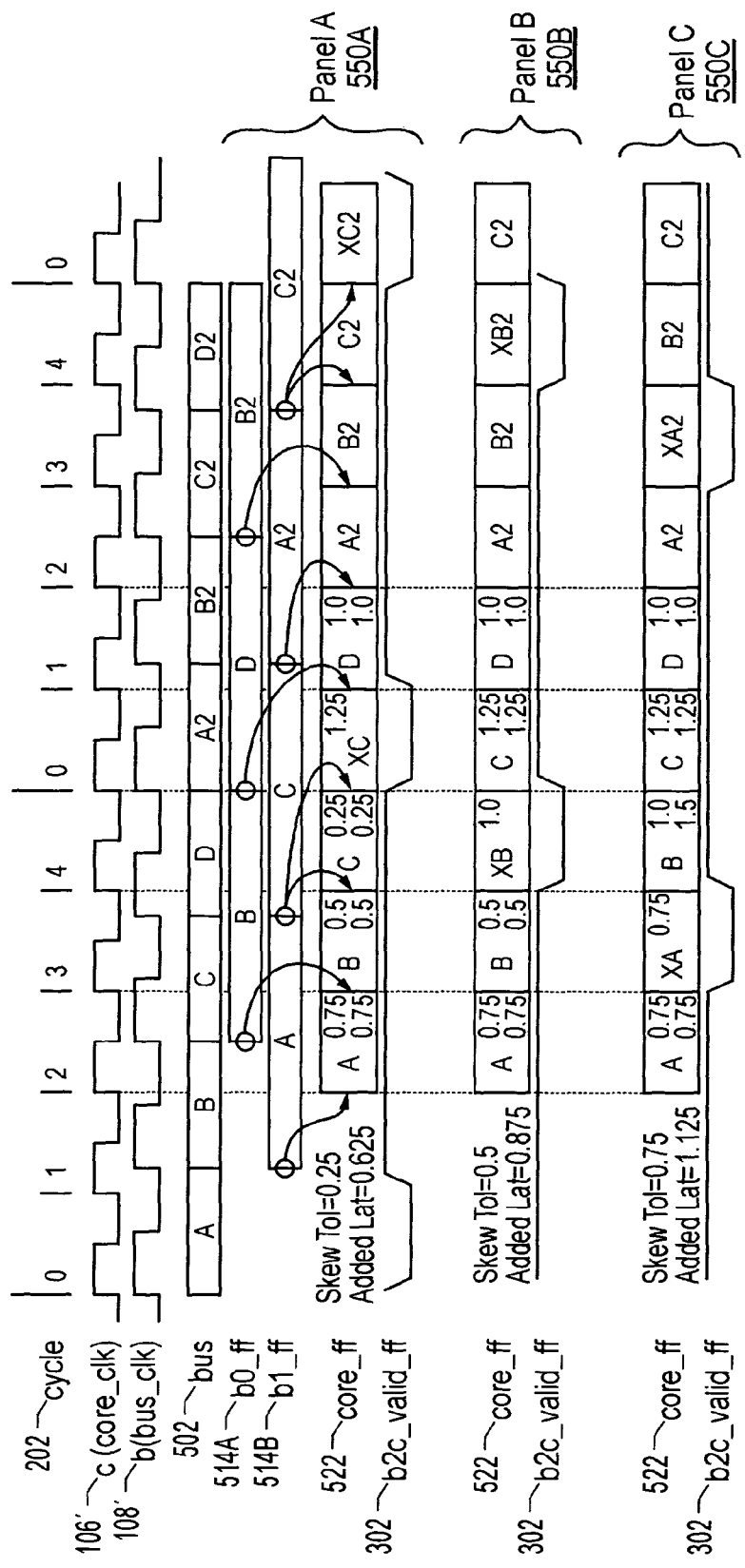
FIG. 5B depicts a timing diagram associated with the synchronizer circuit shown in FIG. 4B.

Again, it will be recognized that in actual implementation, the synchronizer embodiment 500 shown in FIG. 5A may include multiple instances of the various MUXREG blocks to synchronize the transfer of all k data signals (of the k-bit wide bus data, k≧1) from the bus clock domain logic to the core clock domain logic. FIG. 5B depicts a timing diagram associated with the bus-to-core synchronizer embodiment 500 which illustrates the temporal relationship of the various control signals associated therewith and the effect of different skew tolerances and latencies. Two sequences of bus data 502, [A,B,C,D] and [A2,B2,C2,D2], are exemplified, each block being k-bit wide and available for a particular clock cycle, 0 through 3. Different skew tolerances and latency factors may be programmed by controlling when the RECEIVE MUXREG block 516 loads from b0_ff 514A or b1_ff 514B. In 5:4 mode, for example, the RECEIVE MUXREG block 516 loads five times but since only four data transfers can come from the bus domain, only four will be used (the extra cycle having an unused data portion, marked with an X in the Panels 550A–550C). As shown in FIG. 5B, bus data 502 is stored in the TRANSMIT MUXREG blocks where each loads alternatively, under the control of b0_sel_ff 314 and b1_sel_ff 316, on every other bus_clock. Also, each TRANSMIT MUXREG block holds the data for two bus clocks. Accordingly, the first data block [A] is stored in TRANSMIT MUXREG 512B, the second data block [B] in TRANSMIT MUXREG 512A, the third data block [C] in TRANSMIT MUXREG 512B, and finally, the fourth data block [D] in TRANSMIT MUXREG 512A. The output of the two TRANSMIT MUXREG block 512A and 512B, therefore, comprises, data portions [B,D] as b0_ff 514A and [A,C] as b1_ff 514B.

In Panel A 550A, data transfer from the bus domain circuitry to the core domain circuitry is shown where a condition involving skew tolerance of 0.25 and added latency of 0.625 is programmed. Skew tolerance, which is measured in core clock cycles in this case, is defined as the minimum distance between data sample (i.e., core_ff) and changing data input (i.e., b0_ff or b1_ff). Added latency is also measured in core clock cycles, obtained by averaging the values associated with the four data blocks (from start of data input, i.e., b0_ff or b1_ff to core_ff). Actual latency is determined as one bus_clock cycle plus the added latency, which in 5:4 mode translates to 1.25 core_clock cycles plus the added latency.

As shown in Panel A 550A, which exemplifies the best latency condition but with the worst skew tolerance, the core clock synchronizer controller 124 generates the b2c_valid_ff 302 signal such that there is no valid RX operation on cycle 0 of the core_clock (i.e., its first cycle). The output of the RECEIVE MUXREG 516, i.e., core_ff 522, first loads data block [A] from b1_ff 514B, then data block [B] from b0_ff 514A, then data block [C] from b1_ff 514B, and then data block [C] again (in cycle 0 of the core_clock's second sequence, which is the extra cycle unused, hence giving rise to the invalid C or XC data block), and finally, data block [D] from b0_ff 514A. Since the valid [C] block was loaded into core_ff 522 from b1_ff 514B 0.25 core_clock cycles after b1_ff 514B loaded it, the skew tolerance is 0.25 core_clock cycles.

Panel B 550B of FIG. 5B exemplifies the programming mode with the next best latency condition (added latency=0.875) which has the next best skew tolerance (=0.5 core_clock cycles). Under these conditions, the core clock synchronizer controller 124 generates b2c_valid ff 302 such that it is driven LOW in the fifth core_clock cycle (i.e., cycle 4). The output of the RECEIVE MUXREG 516, i.e., core_ff 522, first loads data block [A] from b1_ff 514B, then data block [B] from b0_ff 514A, and again data block [B] that is not used (in cycle 4 of the core_clock's first sequence, which is the extra cycle unused, hence giving rise to the invalid B or XB data block), then data block [C] from b1_ff 514B,and finally, data block [D] from b0_ff 514A. Since the valid [B] block was loaded into core_ff 522 from b0_ff 514A 0.5 core_clock cycles after it appeared on b0_ff 514A, the skew tolerance is 0.5 core_clock cycles.

The programming mode with the worst latency (=1.125) and the best skew tolerance (=0.75 of core_clock cycles) is shown in Panel C 550C of FIG. 5B. The core clock synchronizer controller 124 generates b2c_valid_ff 302 such that it is driven LOW in the fourth core_clock cycle (i.e., cycle 3). The output of the RECEIVE MUXREG 516, i.e., core_ff 522, first loads data block [A] from b1_ff 514B (in cycle 2 of the core_clock's first sequence), and again data block [A] that is not used (in cycle 3 of the core_clock's first sequence), which is the extra cycle unused, hence giving rise to the invalid A or XA data block), and then data block [B] from b0_ff 514A, then data block [C] from b1_ff 514B, and finally, data block [D] from b0_ff 514A. Since the valid [A] block was loaded into core_ff 522 from b1_ff 514A 0.75 core_clock cycles after it appeared on b1_ff 514A, the skew tolerance is 0.75 core_clock cycles. As pointed out earlier, the added latency is the average of the time (in core_clock cycles) from b0_ff or b1_ff to core_ff for all used data. Accordingly, no latency value is shown in any data portion with an X.

As can be seen from the above discussion, the programmability of the synchronizer system is effectuated by way of generating various synchronizer control signals and transfer control signals that are configurable by the core clock synchronizer controller for different skew tolerances and latency values, which core clock synchronizer controller in turn depends on clock relationship control signals provided by the bus clock synchronizer controller portion, among other inputs. The cooperative functionality of both the synchronizer controller portions will now be set forth in further detail immediately below.

Figure 6:
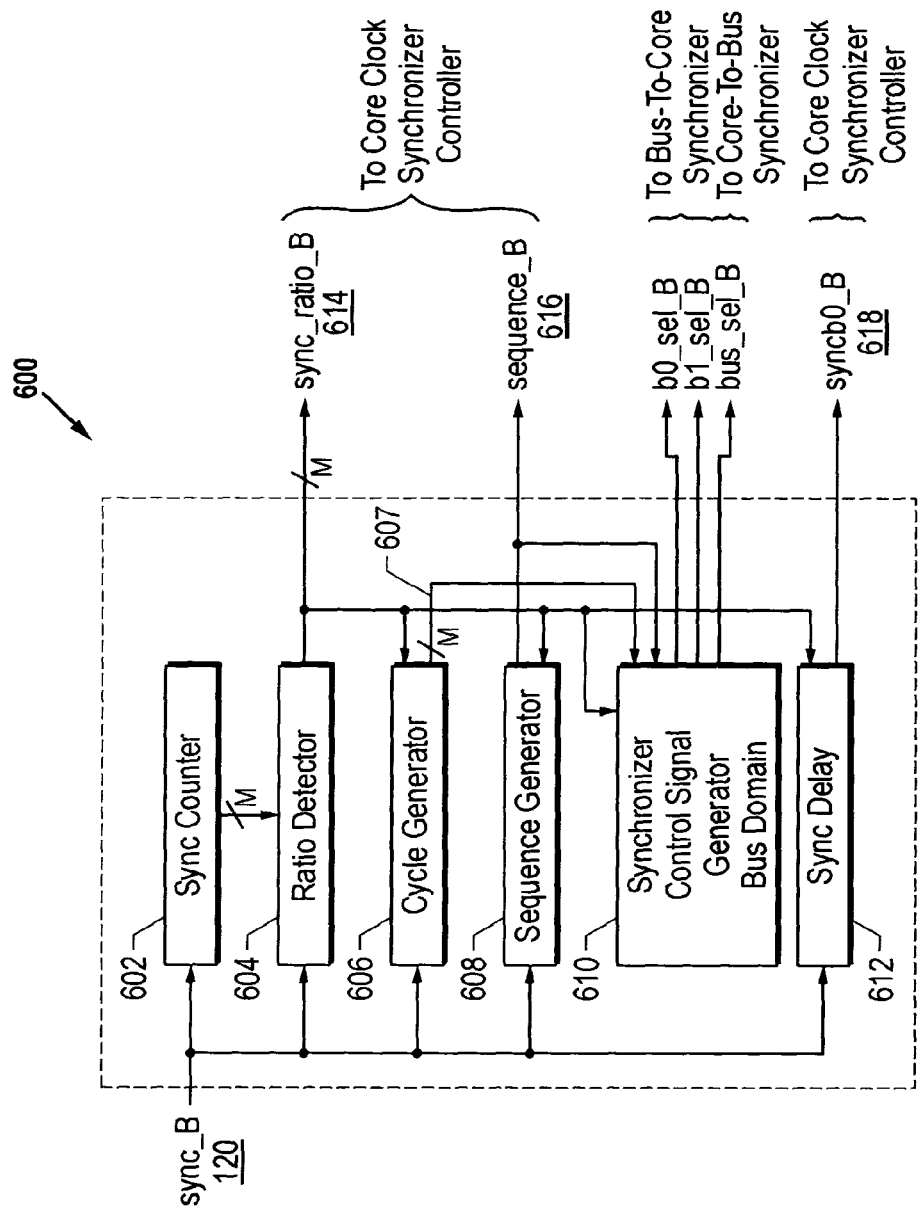
FIG. 6 depicts a block diagram of an embodiment of a bus clock synchronizer controller for controlling a bus-to-core synchronizer circuit shown in FIG. 5A.

FIG. 6 depicts a block diagram of an embodiment of a bus clock synchronizer controller portion 600 that is operable as synchronizer controller 122. As illustrated, several functional blocks, which may be implemented using any combination of logic circuitry, are provided as part of the bus clock synchronizer controller portion 600 for generating a number of clock relationship control signals, part of which are used internally to generate a set of bus domain synchronizer control signals towards the bus-to-core and core-to-bus synchronizers. A sync counter block 602 is operable responsive to the sampled SYNC, i.e., sync_B 120, as well as the distributed bus_clock, b 108' (not shown in this FIG.) for generating an M-bit wide signal that indicates a count of SYNC pulses. In general, $M=\log_2(N+1)$, where N is the number of cycles in the slow clock domain. For instance, where a clock ratio of [8:7] is employed, $M=\log_2(7+1)=3$, i.e., a 3-bit wide signal is generated. A ratio detector block 604 operates responsive to the M-bit wide signal as well as the sync_B signal 120 and b 108' to determine the ratio of the clocks employed in the synchronizer system 100 and generate a clock relationship control signal, designated as sync_ratio_B 614. As will be seen below, this and other clock relationship control signals are provided to the core clock synchronizer controller portion for effectuating the overall programmable controller functionality with respect to the synchronizer system 100.

A cycle generator block 606 is operable responsive to the sync_ratio_B signal 614 as well as the sync_B signal 120 and b 108' for generating a cycle information signal 607 indicative of a current bus clock cycle. A sequence generator block 608 is provided for generating another inter-controller clock relationship control signal, sequence_B 616, in response to the sync_ratio_B signal 614 as well as the sync_B signal 120 and b 108'. It should be appreciated by one skilled in the art that the cycle information and sequence_B signals operate to uniquely identify different bus clocks in the synchronizer system 100. A sync delay block 612 is responsible for generating another clock relationship control signal, syncb0_B 618, towards the core clock synchronizer controller portion of the controller arrangement.

A bus domain synchronizer control signal generator block 610 is operable responsive to the cycle information signal (which numbers each bus clock cycle), the sequence_B signal (which numbers a sequence of bus clocks) and sync_ratio_B signal 614 for generating a set of bus domain synchronizer control signals, namely, b0_sel_B and b1_sel_B signals towards the bus-to-core synchronizer 105B and bus_sel_B signal towards the core-to-bus synchronizer 105A, which function as described in the foregoing description. The bus domain synchronizer control signal generator block 610 essentially operates to generate a fixed pattern on these control signals for each different bus clock (based on the cycle, sequence and clock ratio inputs).

As alluded to hereinabove, the bus domain synchronizer control signals, b0_sel_B, b1_sel_B, and bus_sel_B, may be registered one or several times for timing reasons before being used by the respective synchronizers as b0_sel_ff 314, b1_sel_ff 316, and bus_sel_ff 318, respectively. Accordingly, the original signals and their registered counterparts may be treated as equivalents for purposes of general operation of the controller arrangement. When the control signals are finally used, b0_sel_ff 314 will be "0" on cycle 0, sequence 0, and alternates to "1", then to "0", et cetera. The b1_sel_ff 316, and bus_sel_ff 318 signals are the inverse of b0_sel_ff (i.e., "1" on cycle 0, sequence 0, and so on), as shown in FIG. 3. These synchronizer control signals do not change for different clock ratios or modes.

Figure 7:
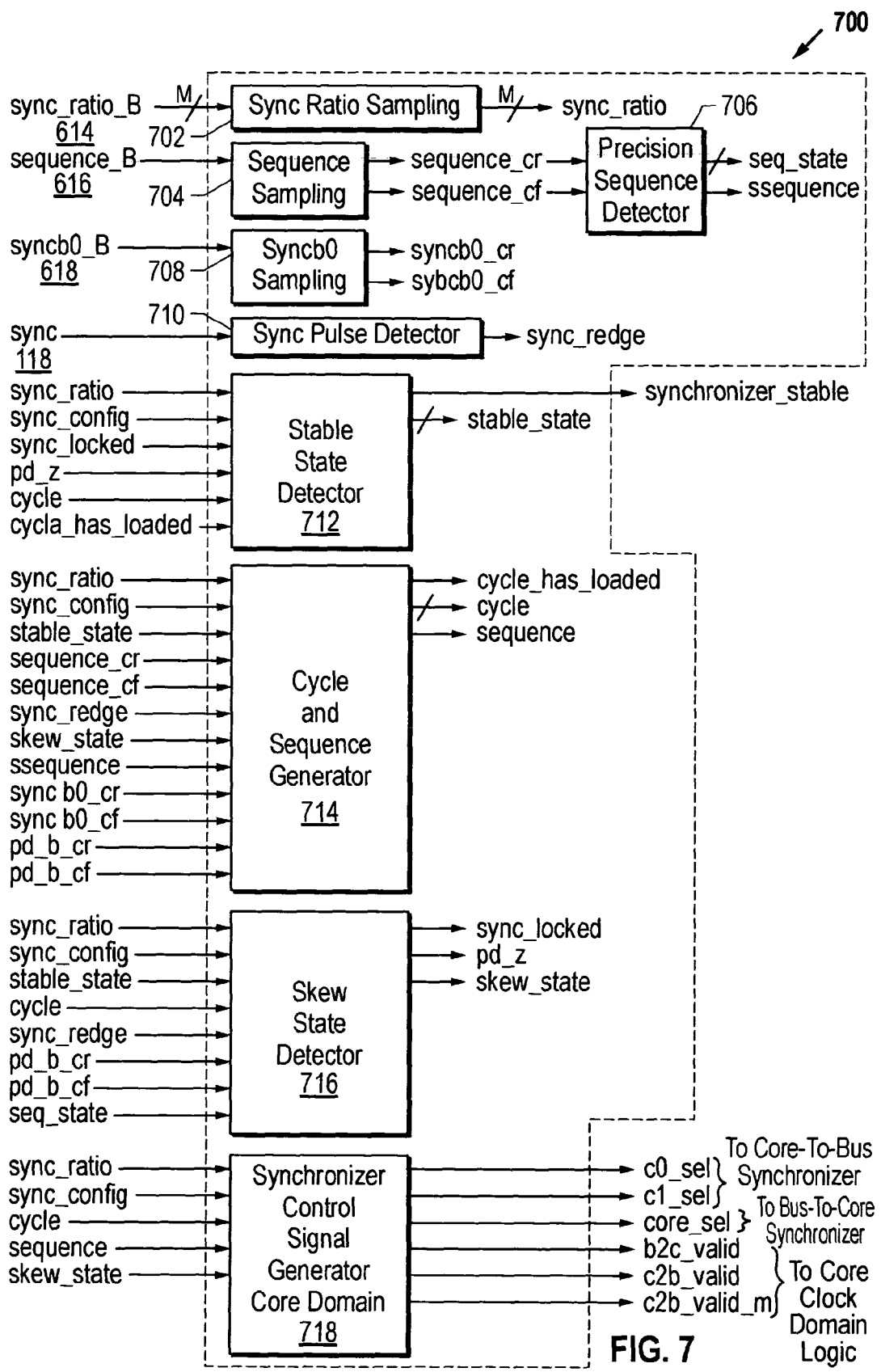
FIG. 7 depicts a block diagram of an embodiment of a core clock synchronizer controller for controlling a core-to-bus synchronizer circuit shown in FIG. 4A.

Referring now to FIG. 7, depicted therein is a block diagram of an embodiment of a core clock synchronizer controller portion 700, operable as synchronizer controller 124 of the programmable synchronizer system 100 set forth above. Several functional blocks are illustrated for concisely capturing the overall functionality of the core clock synchronizer controller portion 700, which essentially operates to generate a set of core domain synchronizer control signals towards the respective synchronizers 105A, 105B, in response to the sampled sync pulse 118, the inter-controller clock relationship control signals 614, 616, 618, and configuration information provided via SYNC configuration interface 126. As illustrated in FIG. 7, the configuration information is exemplified as a sync_config signal that is supplied to several functional blocks of the core clock synchronizer controller portion 700 that provide additional internal signals for effectuating the synchronizer controller functionality. Again, as with the functional blocks of the bus clock synchronizer controller, the various functional blocks of the core clock synchronizer controller portion 700 may also be implemented using any combination of logic circuitry.

Figures 8A, 8B, 8C, 8D:
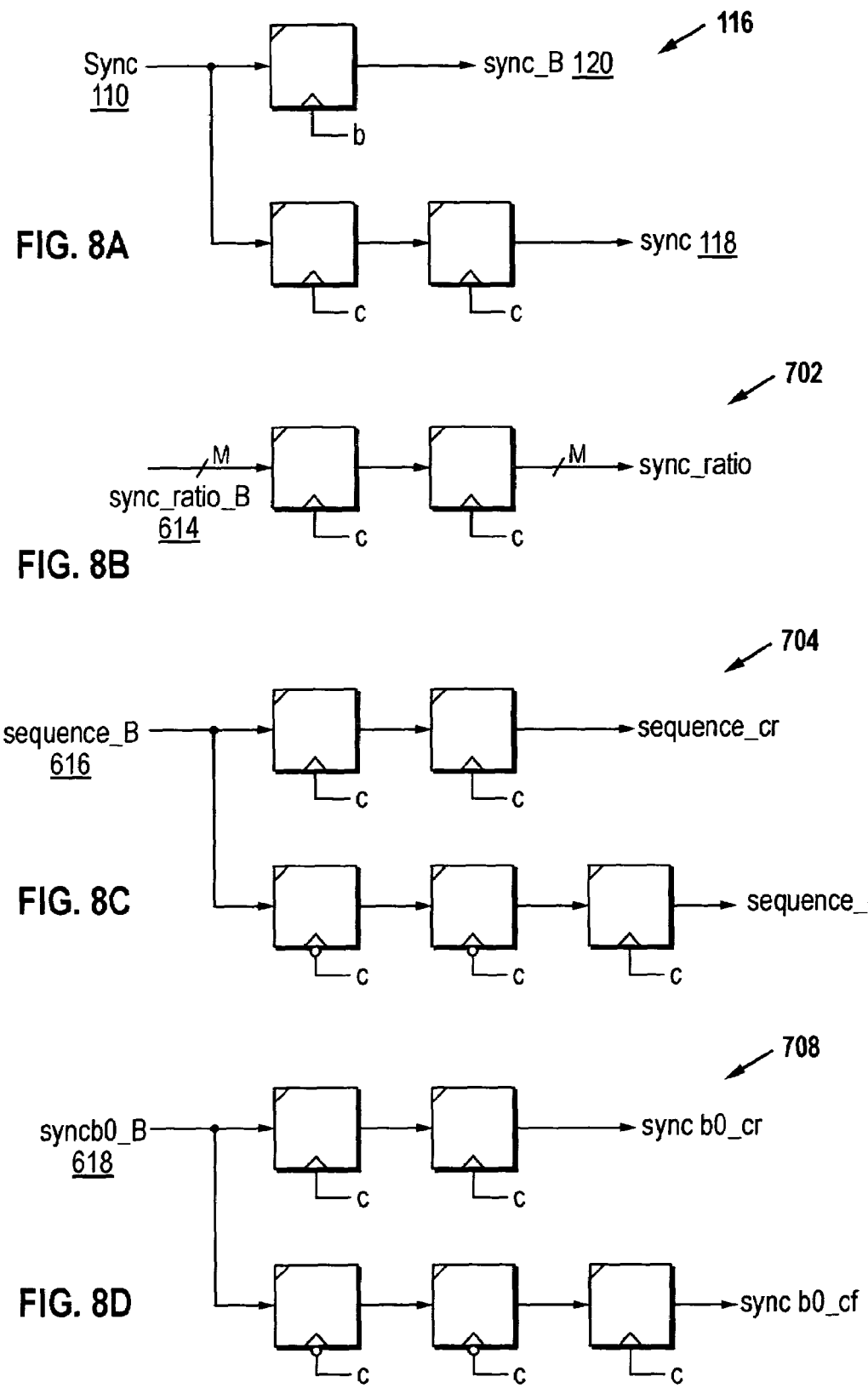
FIG. 8A depicts a block diagram of an embodiment of a SYNC sampling logic block.
FIG. 8B depicts a block diagram of an embodiment of a sync ratio sampling block provided as part of the core clock synchronizer controller shown in FIG. 7.
FIG. 8C depicts a block diagram of an embodiment of a sequence sampling block provided as part of the core clock synchronizer controller shown in FIG. 7.
FIG. 8D depicts a block diagram of an embodiment of a syncb0 sampling block provided as part of the core clock synchronizer controller shown in FIG. 7.

A sync ratio sampling block 702 receives the M-bit wide sync_ratio_B 614 from the bus clock synchronizer controller portion 600 to generate a sync_ratio signal that is sampled in the core clock domain using the distributed core clock c 106'. FIG. 8B depicts an exemplary embodiment of the Sync Ratio Sampling block 702. Likewise, the other two clock relationship control signals provided by the bus clock synchronizer controller portion are sampled before being used internally. A sequence sampling block 704 operates responsive to sequence_B 616 to generate sequence_cr (sampling on the rising edge of the c clock) and sequence_cf (sampling on the falling edge of the c clock) signals that are used by a precision sequence detector block 706. A syncb0_B sampling block 708 operates responsive to syncb0_B 618 to generate syncb0_cr and syncb0_cf signals. FIGS. 8C and 8D depict, respectively, the embodiments of the sequence sampling block 704 and syncb0_B sampling block 708.

Figure 8E:
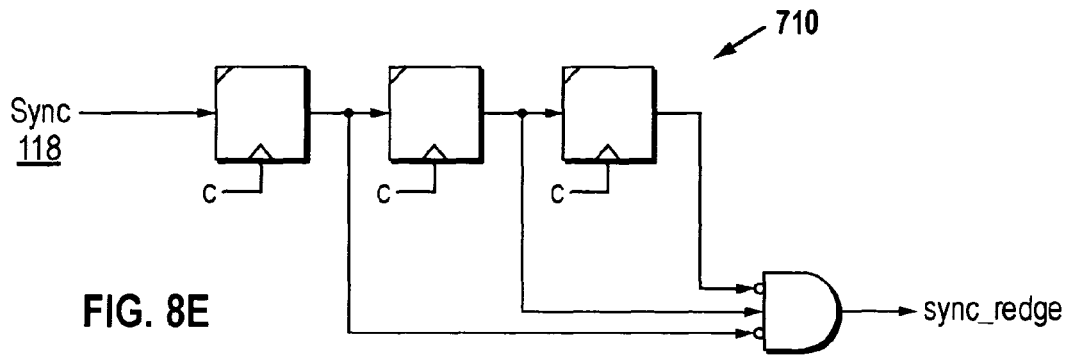
FIG. 8E depicts a block diagram of an embodiment of a sync pulse detection block provided as part of the core clock synchronizer controller shown in FIG. 7.

The sync pulse 118 provided by the SYNC sampling logic 116 is detected by a sync pulse detection block 710 to generate an internal sync signal, sync_redge. FIG. 8E shows an embodiment of the sync pulse detection block 710 for detecting a "010" sequence on the sync pulse, indicating a reliable sync pulse (otherwise, there may be too much clock skew).

A stable state detector block 712 is operable to generate a multi-bit wide internal signal, stable_state, to indicate when the skew state relationship between the two clock signals has been stabilized. Also generated is an external signal, synchronizer_stable signal, to indicate to the synchronizers that a stable condition between them exists. A cycle and sequence generator block 714 is operable responsive to several internal control signals for generating appropriate cycle and sequence signals valid for the core clock domain that uniquely identify different core clock cycles. A skew state detector 716 is provided for generating a skew-state control signal, a phase detection signal (pd_z), and a sync_locked signal, which are provided to various functional blocks described above for generating other internal control signals.

A core domain synchronizer control signal generator 718 is operable responsive to the skew_state control signal (indicative of a current skew relationship between the bus clock and core clock signals), configuration information (via the sync_config signal), and the internal control signals, i.e., clock and sequence signals and the sampled sync_ratio signal (indicative of what the clock ratio is, e.g., 5:4 or 4:3 or 1:1, et cetera), for generating a set of core domain synchronizer control signals towards the respective synchronizers 105A, 105B. As explained in detail hereinabove with respect to the 5:4 ratio implementation, these signals comprise c0_sel, c1_sel (both provided to the core-to-bus synchronizer) and core_sel (provided to the bus-to-core synchronizer). Further, a set of transfer control signals, b2c_valid, c2b_valid signals and advance warning signals, i.e., c2b_valid_m signals, are also provided by the core domain synchronizer control signal generator block 718 to the core clock domain logic circuitry 103A. As with the control signals generated by the bus clock synchronizer controller portion, these various signals may also be registered for timing purposes. Accordingly, the control signals from the core clock synchronizer controller portion may be denoted as their registered equivalents having the "_ff" notation.

Additional details regarding the various functional blocks and subsystems described hereinabove with respect to the bus clock synchronizer controller portion and core clock synchronizer controller portion as well as the overall programable synchronizer system may be found in the following commonly owned co-pending patent applications: (i) "System and Method for Synchronizing Multiple Synchronizer Controllers," filed on Jul. 30, 2003; application Ser. No. 10/629,989, in the name(s) of: Richard W. Adkisson; (ii) "System and Method for Maintaining a Stable Synchronization State in a Programmable Clock Synchronizer," filed on Jul. 30, 2003; application Ser. No. 10/630,297, in the name(s) of: Richard W. Adkisson; (iii) "System and Method for Compensating for Skew between a First Clock Signal and a Second Clock Signal," filed on Jul. 30, 2003; application Ser. No. 10/630,317, in the name(s) of: Richard W. Adkisson; and (iv) "Phase Detector for a Programmable Clock Synchronizer," filed on Jul. 30, 2003; application Ser. No. 10/630,298 (now issued as U.S. Pat. No. 6,864,722), in the name(s) of: Richard W. Adkisson, all of which are incorporated by reference herein.

As pointed out earlier, the sync_config signal provided to the core domain synchronizer control signal generator block 718 indicates to it which skew tolerance and latency value to use. Based thereon, the various core domain synchronizer control signals and the transfer control signals may be programmed for different latencies and skew tolerances. The effect of programming different values is described below, taken in conjunction with the timing diagrams (shown in FIGS. 3, 4B and 5B) described above.

In particular reference to FIG. 5B, shown therein is how the core_sel_ff 312 and b2c_valid ff 302 signals can be programmed for different latencies and skew tolerances. As described previously, b0_sel_B and b1_sel_B (generated by the bus clock synchronizer controller portion 600 and may be registered one or more times) have a fixed and known pattern. Accordingly, the core_sel_ff 312 and b2c_valid_ff 302 signals are varied for different conditions (keeping in mind that b2c_valid_ff is the same as b2c_valid registered for timing purposes).

In Panel 550A, which exemplifies the condition of the lowest skew tolerance (0.25 core clock cycle) and lowest latency (0.625 added core clock cycle), core_sel_ff 312 is programmed to sample b1_ff 514B such that data portion A is registered into core_ff 522 in cycle 2, b0_ff 514A is sampled next and data portion B is registered into core_ff 522 in cycle 3, data portion C in cycle 4, data portion C again in cycle 0 (but not used, hence XC notation), and data portion D in cycle 1 (next sequence). The transfer control signal b2c_valid_ff 302 is programmed such that the core clock domain logic does not use the extra data portion C (i.e., XC block) in cycle 0.

The middle skew tolerance (0.5 core clock cycle) and latency (0.875 added core clock cycle), shown in Panel 550B, is achieved by programming core_sel_ff 312 to capture data portion A in cycle 2, data portion B in cycle 3, extra data B again in cycle 4, data portion C in cycle 0 (commencement of the following sequence), and data portion D in cycle 1. The transfer control signal b2c_valid_ff 302 is programmed such that the core clock domain logic does not use the extra data portion B (i.e., XB block) in cycle 4.

The highest skew tolerance (0.75 core clock cycle) and latency (1.125 added core clock cycles), shown in Panel 550C of FIG. 5B, is achieved by programming core_sel_ff 312 to capture data portion A in cycle 2, extra data A again in cycle 3, data B in cycle 4, data portion C in cycle 0 (commencement of the following sequence), and data portion D in cycle 1. The transfer control signal b2c_valid_ff 302 is programmed such that the core clock domain logic does not use the extra data portion A (i.e., XA block) in cycle 3.

Each of the above three different skew tolerances and latency settings are achieved by using three different values on sync_config signal provided via SYNC configuration interface 126 (shown in FIG. 1). A different pattern may be generated for other clock ratios (as indicated by sync_ratio signal), as one skilled in the art should recognize.

Taking reference now to FIG. 4B, shown therein is how the c0_sel_ff 308, c1_sel_ff 310 and c2b_valid_ff 304 signals can be programmed for different latencies and skew tolerances. As described previously, c2b_valid_ff 304 indicates to the core clock domain logic circuitry not to transmit data. Again, it should be kept in mind that c2b_valid_ff is the same as c2b_valid that is registered for timing purposes. The advance warning signals, c2b_valid_m_ff[1:4] 306A–306D (shown in FIG. 3) represent the c2b_valid signal that is advantageously sent one, two, three or more cycles early for performance optimization in the core clock domain logic circuitry.

Since all the core domain synchronizer control signals and the transfer control signals are decoded from cycle and sequence signals (by the synchronizer Control Generator block 718 shown in FIG. 7), to generate signals early, one merely decodes from an earlier cycle and/or sequence. It should also be noted that low, middle, and high skew tolerances can be programmed for all [N+1:N] ratios. Where a clock ratio of 1:1 is applicable, a normal latency (1 clock added latency) and a low latency (0.5 clock added, if the bus and core clocks are inverted) can be programmed.

Figure 9:
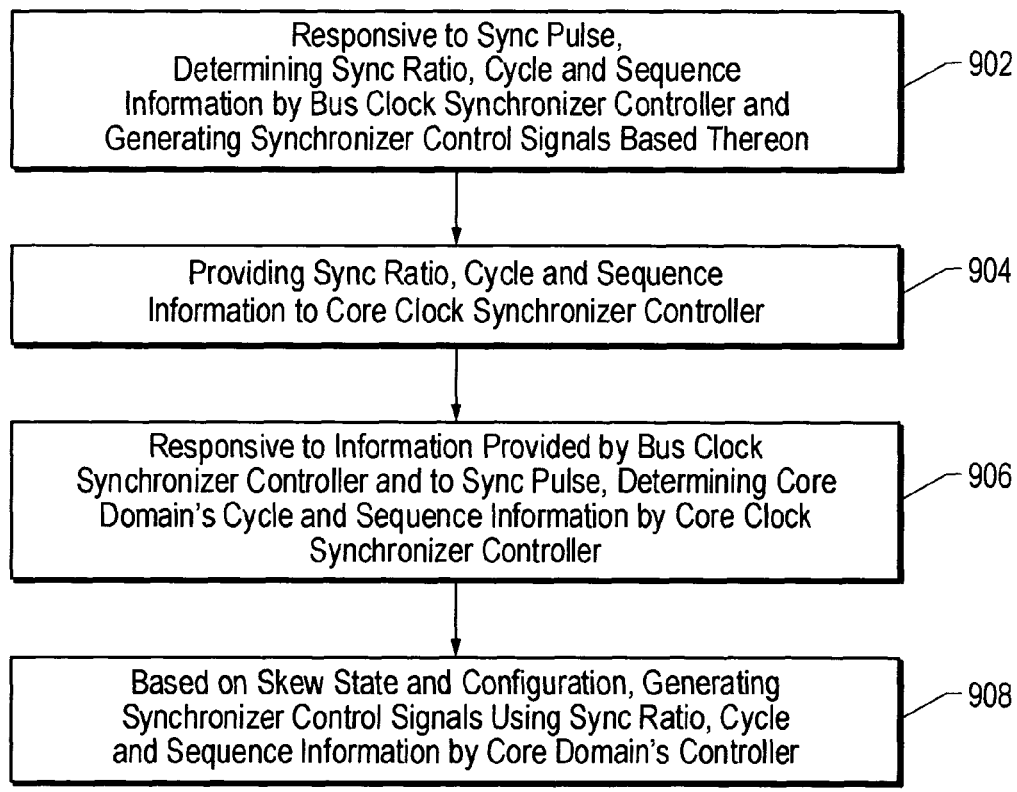
FIG. 9 depicts a flow chart of the various operations of an embodiment of a synchronizer controller method of the present invention.

FIG. 9 depicts a flow chart of the various operations of an embodiment of a synchronizer controller method of the present invention. As set forth in block 902, the bus clock synchronizer controller portion first determines applicable sync ratio, cycle and sequence information for a given clock ratio based on the sampled sync pulse. This information is utilized to generate bus domain synchronizer control signals. Further, the sync ratio, cycle/sequence information and sync delay information is provided as inter-controller clock relationship control signals to the core clock synchronizer controller portion (block 904). Responsive thereto and to the sync pulse, core clock domain's cycle and sequence information is generated by the core clock synchronizer controller (block 906). Based on skew state determination, cycle and sequence information, sync ratio information, and sync configuration information, synchronizer control signals as well as transfer control signals are generated for controlling the data transfer operations via bus-to-core and core-to-bus synchronizer portions (block 908).

Based on the foregoing Detailed Description, it should be appreciated that the controller arrangement embodiment set forth herein may be programmed for different latencies and skew tolerances for transferring data across a clock boundary between any two clock domains having a known N:M ratio (e.g., M=N−1). Accordingly, if the PLL or clock distribution used in a synchronizer system has more skew than anticipated, the skew tolerance can be increased (with the trade-off of a larger latency) without having to design a different controller.

Although the invention has been particularly described with reference to certain illustrations, it is to be understood that the forms of the invention shown and described are to be treated as exemplary embodiments only. Various changes, substitutions and modifications can be realized without departing from the spirit and scope of the invention as defined by the appended claims.

What is claimed is:

1. A controller arrangement for effectuating data transfer between a core clock domain and a bus clock domain, wherein said core clock domain is operable with a core clock signal and said bus clock domain is operable with a bus clock signal, said core and bus clock signals having a ratio, comprising:
a bus clock synchronizer controller portion operating to generate a set of clock relationship control signals, wherein at least a portion of said clock relationship control signals are used in generating a set of bus domain synchronizer control signals towards a bus-to-core synchronizer and a core-to-bus synchronizer; and
a core clock synchronizer controller portion operating to generate a set of core domain synchronizer control signals towards said bus-to-core synchronizer and said core-to-bus synchronizer, said core clock synchronizer controller portion operating responsive to said clock relationship control signals provided by said bus clock synchronizer controller portion and configuration information indicative of different skew tolerances and latency values associated with at least one of said bus clock and core clock signals.

2. The controller arrangement as recited in claim 1, wherein said bus clock synchronizer controller portion is operable responsive to a SYNC pulse that is sampled in said bus clock domain by said bus clock signal.

3. The controller arrangement as recited in claim 2, wherein said SYNC pulse is generated by a phase-locked loop (PLL) when a rising edge in said core clock signal is at least substantially coincident with a rising edge in said bus clock signal.

4. The controller arrangement as recited in claim 2, wherein said core clock synchronizer controller portion is operable responsive to said SYNC pulse that is sampled in said core clock domain by said core clock signal.

5. The controller arrangement as recited in claim 4, wherein said bus clock synchronizer controller portion comprises:
a sync counter and a ratio detector operating responsive to said sampled SYNC pulse in said bus clock domain for determining a sync_ratio signal;
a cycle generator operating responsive to said sync_ratio signal and said sampled SYNC pulse in said bus clock domain for generating a cycle information signal indicative of a current clock cycle;
a sequence generator operating responsive to said sync_ratio signal and said sampled SYNC pulse in said bus clock domain for generating a sequence signal; and
a bus domain synchronizer control signal generator block operating responsive to said sync_ratio signal, said sequence signal and said cycle information signal for generating said set of bus domain synchronizer control signals towards said bus-to-core synchronizer and said core-to-bus synchronizer, wherein said sync_ratio signal and said sequence signal are provided as part of said set of clock relationship control signals to said core clock synchronizer controller portion.

6. The controller arrangement as recited in claim 5, wherein said core clock synchronizer controller portion comprises a core domain synchronizer control signal generator block operating responsive to said configuration information and a plurality of internal control signals manufactured based on said set of clock relationship control signals provided by said bus clock synchronizer controller portion, for generating said set of core domain synchronizer control signals towards said bus-to-core synchronizer and said core-to-bus synchronizer.

7. The controller arrangement as recited in claim 6, wherein said core clock synchronizer controller portion is further operable to generate a set of transfer control signals indicative of when valid data transfer can occur between said bus clock domain's circuitry and said core clock domain's circuitry.

8. The controller arrangement as recited in claim 6, wherein said core clock synchronizer controller portion further comprises a skew state detector for generating a skew_state control signal indicative of a current skew relationship between said bus clock and core clock signals, said skew_state control signal being provided to said core domain synchronizer control signal generator block for generating said set of core domain synchronizer control signals towards said bus-to-core synchronizer and said core-to-bus synchronizer.

9. The controller arrangement as recited in claim 6, wherein said bus clock synchronizer controller portion further comprises a sync delay block operating responsive to said sync ratio signal and said sampled SYNC pulse in said bus clock domain for generating a syncb0 signal, said syncb0 signal being provided as part of said set of clock relationship control signals to said core clock synchronizer controller portion.

10. A controller arrangement operable with a programmable synchronizer system for effectuating data transfer between core logic circuitry disposed in a core clock domain and bus logic circuitry disposed in a bus clock domain, wherein said core clock domain is operable with a core clock signal and said bus clock domain is operable with a bus clock signal, said core and bus clock signals having a ratio of N core clock cycles to M bus clock cycles, where N/M≧1, comprising:

means disposed in said bus clock domain for generating a set of clock relationship control signals responsive to a SYNC pulse that is sampled in said bus clock domain, wherein at least a portion of said clock relationship control signals are used in generating a set of bus domain synchronizer control signals towards a bus-to-core synchronizer and a core-to-bus synchronizer; and means disposed in said core clock domain for generating a set of core domain synchronizer control signals towards said bus-to-core synchronizer and said core-to-bus synchronizer, said means disposed in said core clock domain operating responsive to said SYNC pulse that is sampled in said core clock domain and to said clock relationship control signals provided by said means disposed in said bus clock domain, wherein a configuration interface provides configuration information to said means disposed in said core clock domain for compensating for at least one of a variable skew factor and a variable latency factor associated with said core clock signal.

11. The controller arrangement as recited in claim 10, wherein said means disposed in said bus clock domain comprises:

a sync counter and a ratio detector operating responsive to said sampled SYNC pulse in said bus clock domain for determining a sync_ratio signal;

a cycle generator operating responsive to said sync_ratio signal and said sampled SYNC pulse in said bus clock domain for generating a cycle information signal indicative of a current clock cycle;

a sequence generator operating responsive to said sync_ratio signal and said sampled SYNC pulse in said bus clock domain for generating a sequence signal; and a bus domain synchronizer control signal generator block operating responsive to said sync_ratio signal, said sequence signet and said cycle information signal for generating said set of bus domain synchronizer control signals towards said bus-to-core synchronizer and said core-to-bus synchronizer, wherein said sync_ratio signal and said sequence signal are provided as part of said set of clock relationship control signals to said means disposed in said core clock domain.

12. The controller arrangement as recited in claim 11, wherein said means disposed in said core clock domain comprises a core domain synchronizer control signal generator block operating responsive to said configuration information and a plurality of internal control signals manufactured based on said set of clock relationship control signals provided by said means disposed in said bus clock domain, for generating said set of core domain synchronizer control signals towards said bus-to-core synchronizer and said core-to-bus synchronizer and for generating a set of transfer control signals indicative of when valid data transfer can occur between said bus logic circuitry and said core logic circuitry.

13. The controller arrangement as recited in claim 12, wherein said SYNC pulse is generated by a phase-locked loop (PLL) when a rising edge in said core clock signal is at least substantially coincident with a rising edge in said bus clock signal.

14. The controller arrangement as recited in claim 12, wherein said core-to-bus synchronizer comprises:

a first TRANSMIT multiplex-register (MUXREG) block disposed in said core clock domain, said first TRANSMIT MUXREG block operating to transmit a portion of data responsive to a c0_sel control signal that is registered using said core clock signal, wherein said data is generated in said core clock domain by said core logic circuitry and said c0_sel control signal generated by said core domain synchronizer control signal generator block;

a second TRANSMIT MUXREG block in said core clock domain for transmitting another portion of said data generated in said core clock domain responsive to a c1_sel control signal that is registered using said core clock signal, wherein said c1_sel control signal is generated by said core domain synchronizer control signal generator block; and a RECEIVE MUXREG block, disposed in said bus clock domain for receiving said data from said first and second TRANSMIT MUXREG blocks in a serial fashion responsive to a bus_sel control signal that is registered using said bus clock signal, wherein said bus_sel control is generated by said bus domain synchronizer control signal generator block.

15. The controller arrangement as recited in claim 14, wherein said core logic circuitry is operable responsive to a c2b_valid signal provided as part of said transfer control signals by said core domain synchronizer control signal generator block.

16. The controller arrangement as recited in claim 15, wherein said c2b_valid signal, said c0_sel control signal and said c1_sel control signal are programmable for different skew tolerance and latency values based on said configuration information.

17. The controller arrangement as recited in claim 12, wherein said means disposed in said core clock domain further comprises a skew state detector for generating a skew_state control signal indicative of a current skew relationship between said bus clock and core clock signals, said skew_state control signal being provided to said core domain synchronizer control signal generator block.

18. The controller arrangement as recited in claim 12, wherein said means disposed in said bus clock domain further comprises a sync delay block operating responsive to said sync_ratio signal and said sampled SYNC pulse in said bus clock domain for generating a syncb0 signal, said syncb0 signal being provided as part of said set of clock relationship control signals to said means disposed in said core clock domain.

19. The controller arrangement as recited in claim 12, wherein said bus-to-core synchronizer comprises:

a first TRANSMIT multiplex-register (MUXREG) block disposed in said bus clock domain, said first TRANSMIT MUXREG block operating to transmit a portion of data responsive to a b0_sel control signal that is registered using said bus clock signal, wherein said data is generated in said bus clock domain by said bus logic circuitry and said b0_set control signal is generated by said bus domain synchronizer control signal generator block;

a second TRANSMIT MUXREG block in said bus clock domain for transmitting another portion of said data generated in said bus clock domain responsive to a b1_sel control signal that is registered using said bus clock signal, wherein said b1_sel control signal is generated by said bus domain synchronizer control signal generator block; and a RECEIVE MUXREG block disposed in said core clock domain for receiving said data from said first and second TRANSMIT MUXREG blocks in a serial fashion responsive to a core_sel control signal that is registered using said core clock signal, wherein said core_sel control is generated by said core domain synchronizer control signal generator block.

20. The controller arrangement as recited in claim 19, wherein said core logic circuitry is operable responsive to a b2c_valid signal provided as part of said transfer control signals by said core domain synchronizer control signal generator block.

21. The controller arrangement as recited in claim 20, wherein said b2c_valid signal and said core_sel control signal are programmable for different skew tolerance and latency values based on said configuration information.

22. A computer system having a controller arrangement operable with a programmable synchronizer apparatus for effectuating data transfer between core logic circuitry disposed in a core clock domain and bus logic circuitry disposed in a bus clock domain, wherein said core clock domain is operable with a core clock signal and said bus clock domain is operable with a bus clock signal, said core and bus clock signals having a ratio of N core clock cycles to M bus clock cycles, where $N/m \geq 1$, comprising:

a bus clock synchronizer controller portion operating to generate a set of clock relationship control signals, wherein at least a portion of said clock relationship control signals are used in generating a set of bus domain synchronizer control signals towards a bus-to-core synchronizer and a core-to-bus synchronizer; and a core clock synchronizer controller portion operating to generate a set of core domain synchronizer control signals towards said bus-to-core synchronizer and said core-to-bus synchronizer, said core clock synchronizer controller portion operating responsive to said clock relationship control signals provided by said bus clock synchronizer controller portion and configuration information indicative of different skew tolerances and latency values associated with at least one of said bus clock and core clock signals.

23. The computer system as recited in claim 22, wherein said bus clock synchronizer controller portion is operable responsive to a SYNC pulse that is sampled in said bus clock domain by said bus clock signal.

24. The computer system as recited in claim 23, wherein said SYNC pulse is generated by a phase-locked loop (PLL) when a rising edge in said core clock signal is at least substantially coincident with a rising edge in said bus clock signal.

25. The computer system as recited in claim 23, wherein said core clock synchronizer controller portion is operable responsive to said SYNC pulse that is sampled in said core clock domain by said core clock signal.

26. The computer system as recited in claim 25, wherein said bus clock synchronizer controller portion comprises:

a sync counter and a ratio detector operating responsive to said sampled SYNC pulse in said bus clock domain for determining a sync_ratio signal;

a cycle generator operating responsive to said sync_ratio signal and said sampled SYNC pulse in said bus clock domain for generating a cycle information signal indicative of a current clock cycle;

a sequence generator operating responsive to said sync ratio signal and said sampled SYNC pulse in said bus clock domain for generating a sequence signal; and a bus domain synchronizer control signal generator block operating responsive to said sync_ratio signal, said sequence signal and said cycle information signal for generating said set of bus domain synchronizer control signals towards said bus-to-core synchronizer and said core-to-bus synchronizer, wherein said sync_ratio signal and said sequence signal are provided as part of said set of clock relationship control signals to said core clock synchronizer controller portion.

27. The computer system as recited in claim 26, wherein said core clock synchronizer controller portion comprises a core domain synchronizer control signal generator block operating responsive to said configuration information and a plurality of internal control signals manufactured based on said set of clock relationship control signals provided by said bus clock synchronizer controller portion, for generating said set of core domain synchronizer control signals towards said bus-to-core synchronizer and said core-to-bus synchronizer.

28. The computer system as recited in claim 27, wherein said core clock synchronizer controller portion is further operable to generate a set of transfer control signals indicative of when valid data transfer can occur between said bus clock domain's circuitry and said core clock domain's circuitry.

29. The computer system as recited in claim 27, wherein said core clock synchronizer controller portion further comprises a skew state detector for generating a skew state control signal indicative of a current skew relationship between said bus clock and core clock signals, said skew_state control signal being provided to said core domain synchronizer control signal generator block for generating said set of core domain synchronizer control signals towards said bus-to-core synchronizer and said core-to-bus synchronizer.

30. The computer system as recited in claim 27, wherein said bus clock synchronizer controller portion further comprises a sync delay block operating responsive to said sync_ratio signal and said sampled SYNC pulse in said bus clock domain for generating a syncb0 signal, said synch0 signal being provided as part of said set of clock relationship control signals.

* * * * *

UNITED STATES PATENT AND TRADEMARK OFFICE
CERTIFICATE OF CORRECTION

PATENT NO. : 7,100,065 B2  
APPLICATION NO. : 10/630182  
DATED : August 29, 2006  
INVENTOR(S) : Richard W. Adkisson It is certified that error appears in the above-identified patent and that said Letters Patent is hereby corrected as shown below:

On the Title page, in Item (54), in column 1, in "Title", line 2, delete "SYNCHRONIZER" and insert -- SYNCHRONIZING --, therefor.

In column 1, line 2, delete "SYNCHRONIZER" and insert -- SYNCHRONIZING --, therefor.

In column 10, line 49, delete "b2c_valid ff" and insert -- b2c_valid_ff --, therefor.

In column 16, line 66, in Claim 9, delete "sync ratio" and insert -- sync_ratio --, therefor.

In column 17, line 48, in Claim 11, delete "signet" and insert -- signal --, therefor.

In column 18, line 25, in Claim 14, after "block" delete ",".

In column 18, line 65, in Claim 19, delete "b0_set" and insert -- b0_sel --, therefor.

In column 19, line 32, in Claim 22, delete "N/m$\geq$1" and insert -- N/M$\geq$1 --, therefor.

In column 20, lines 12-13, in Claim 26, delete "sync ratio" and insert -- sync_ratio --, therefor.

In column 20, line 43, in Claim 29, after "generating a" delete "skew state" and insert -- skew_state --, therefor.

In column 20, line 55, in Claim 30, delete "synch0" and insert -- syncb0 --, therefor.

UNITED STATES PATENT AND TRADEMARK OFFICE
CERTIFICATE OF CORRECTION

PATENT NO. : 7,100,065 B2
APPLICATION NO. : 10/630182
DATED : August 29, 2006
INVENTOR(S) : Richard W. Adkisson It is certified that error appears in the above-identified patent and that said Letters Patent is hereby corrected as shown below:

In column 20, line 57, in Claim 30, delete "signals." and insert -- signals to said core clock synchronizer controller portion. --, therefor.

Signed and Sealed this

Seventeenth Day of February, 2009

JOHN DOLL
*Acting Director of the United States Patent and Trademark Office*